United States Patent
Quinn et al.

(10) Patent No.: US 11,859,756 B2
(45) Date of Patent: Jan. 2, 2024

(54) SYSTEM AND METHOD FOR LOCATING LEAKS IN PIPELINES

(71) Applicant: QINOV8 UK LTD, Durham (GB)

(72) Inventors: Michael Quinn, Durham (GB); Mark Quinn, Durham (GB)

(73) Assignee: QINOV8 UK LTD, Durham (GB)

( * ) Notice: Subject to any disclaimer, the term of this patent is extended or adjusted under 35 U.S.C. 154(b) by 765 days.

(21) Appl. No.: 16/979,587

(22) PCT Filed: Mar. 8, 2019

(86) PCT No.: PCT/GB2019/050657
§ 371 (c)(1),
(2) Date: Sep. 10, 2020

(87) PCT Pub. No.: WO2019/175551
PCT Pub. Date: Sep. 19, 2019

(65) Prior Publication Data
US 2021/0003243 A1    Jan. 7, 2021

(30) Foreign Application Priority Data

Mar. 10, 2018  (GB) .................................... 1804063

(51) Int. Cl.
*F16L 55/48* (2006.01)
*F16L 55/46* (2006.01)
*G01M 3/18* (2006.01)
*F16L 101/30* (2006.01)
*F16L 55/18* (2006.01)

(52) U.S. Cl.
CPC ............... *F16L 55/18* (2013.01); *F16L 55/46* (2013.01); *G01M 3/18* (2013.01); *F16L 2101/30* (2013.01)

(58) Field of Classification Search
CPC ....... F16L 55/48; F16L 55/46; F16L 2201/30; G01M 3/18
See application file for complete search history.

(56) References Cited

U.S. PATENT DOCUMENTS 4,016,748 A * 4/1977 Boyens ................... G01M 3/02
73/40.5 R

* cited by examiner

*Primary Examiner* — Eric Keasel
(74) *Attorney, Agent, or Firm* — Culhane Meadows PLLC; Robert C. Klinger

(57) ABSTRACT

A system for locating a leak site in an underground water pipeline comprises a leak detection element, means for introducing the leak detection element into the pipeline through an outlet of a hydrant, and means for detecting the location of the leak detection element from above the ground. The means for introducing the leak detection element into the pipeline includes capping means adapted for attachment to, and sealing of, the outlet of the hydrant. The capping means has at least one opening therethrough to allow passage of an elongate rod or hose through the capping means and into the outlet of the hydrant. The capping means is provided with a substantially waterproof membrane to provide a seal between the capping means and the outlet of the hydrant, and the at least one opening is provided with a substantially waterproof membrane to provide a seal between the rod or hose and the at least one opening. A method for locating a leak site in an underground water pipeline is also provided.

17 Claims, 8 Drawing Sheets

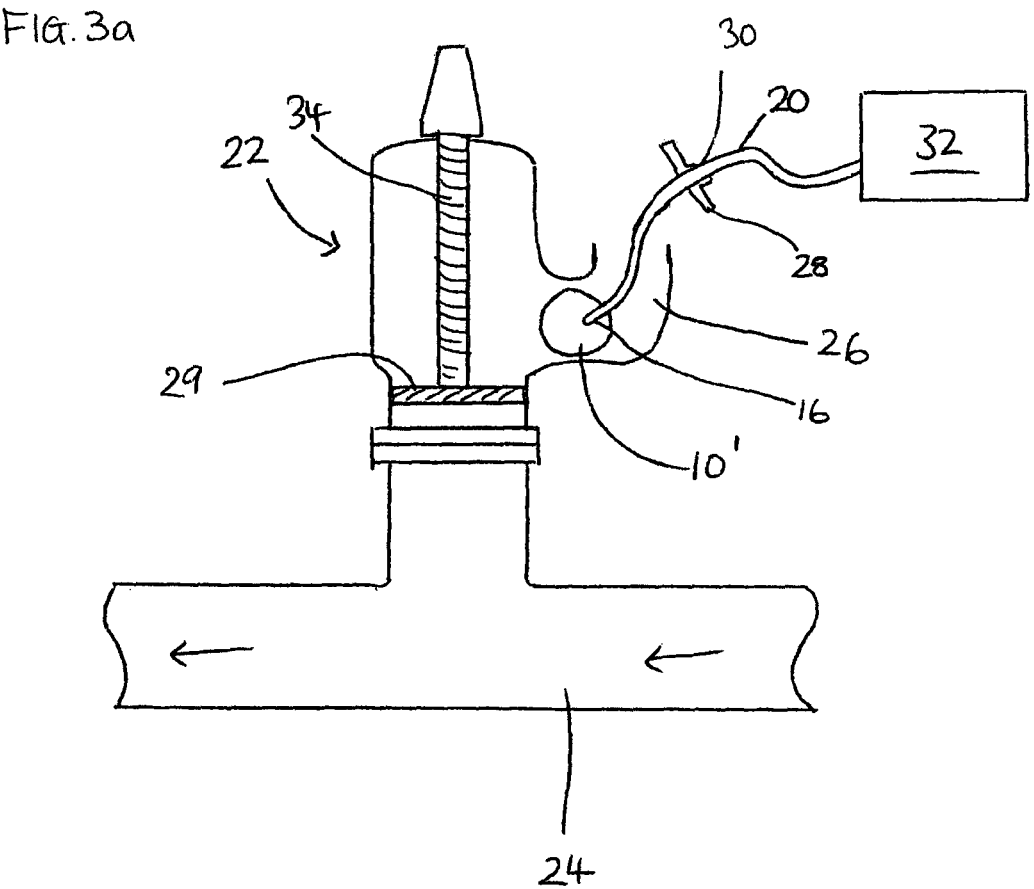

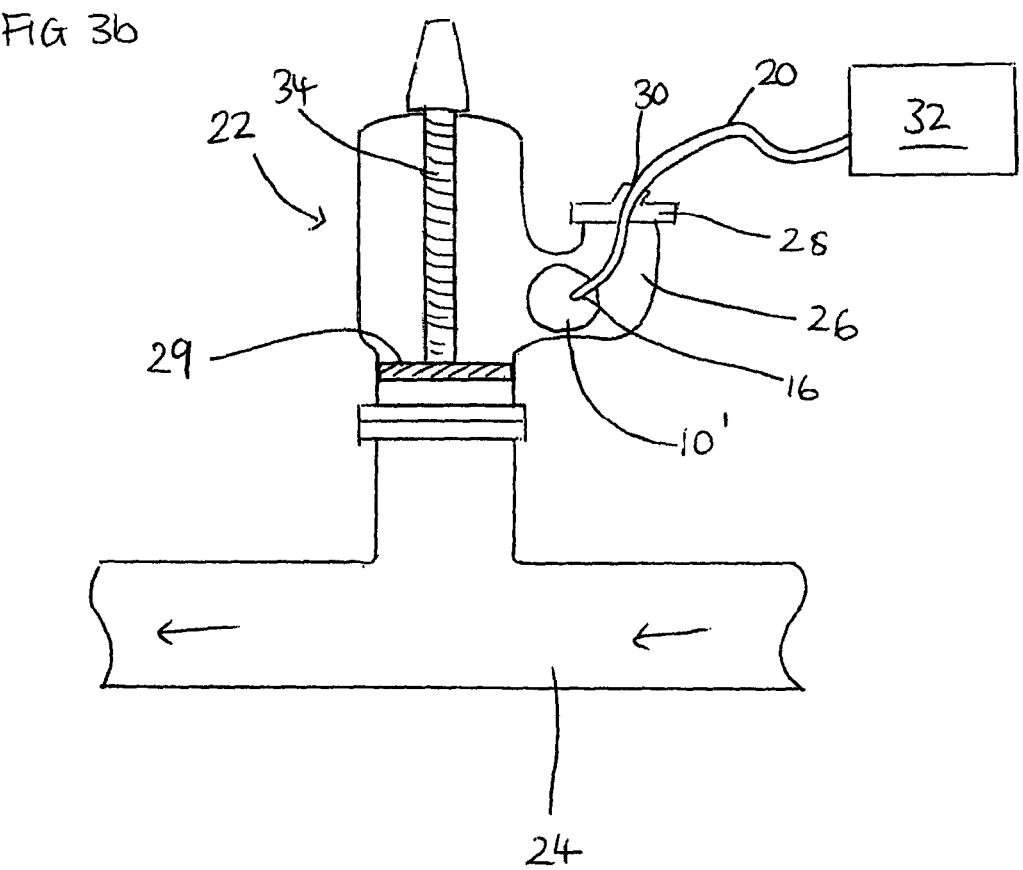

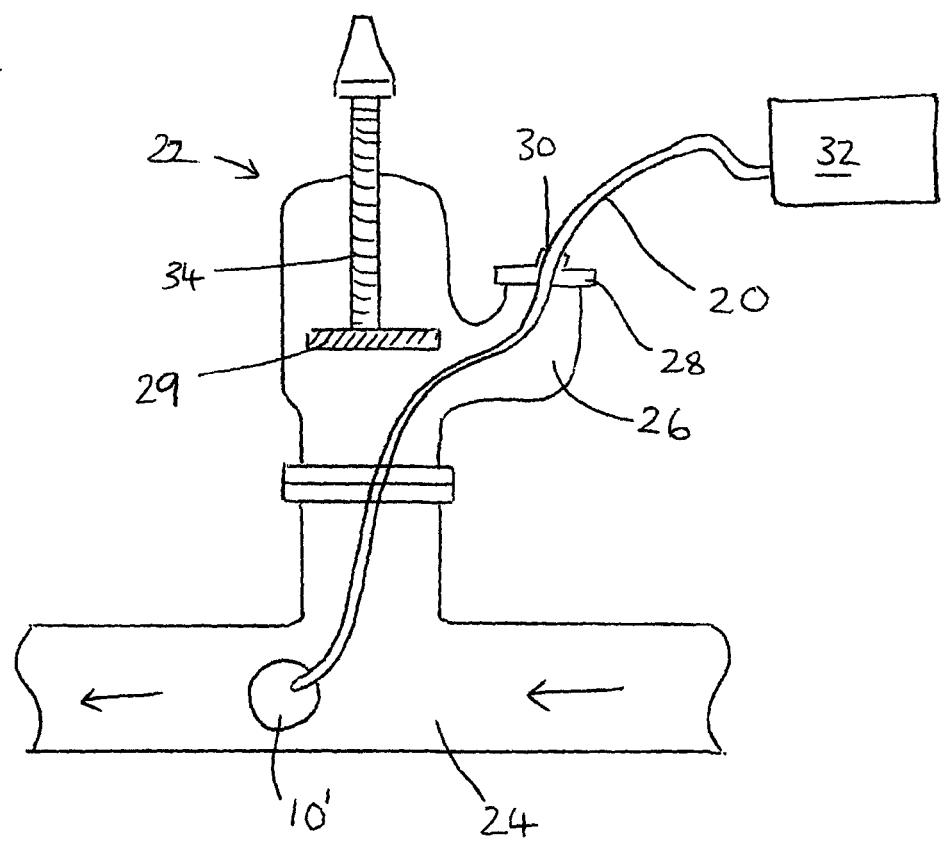

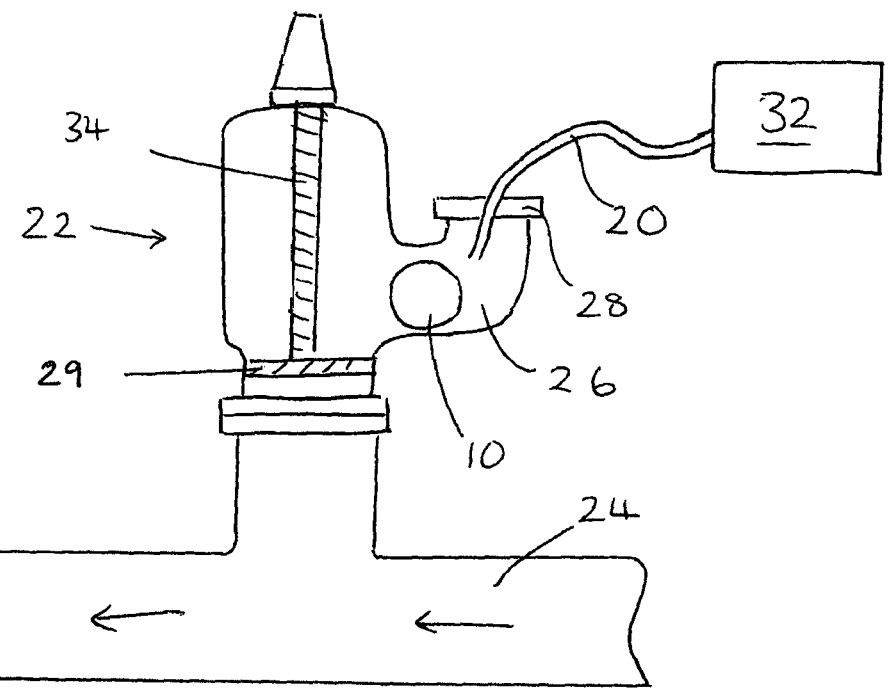
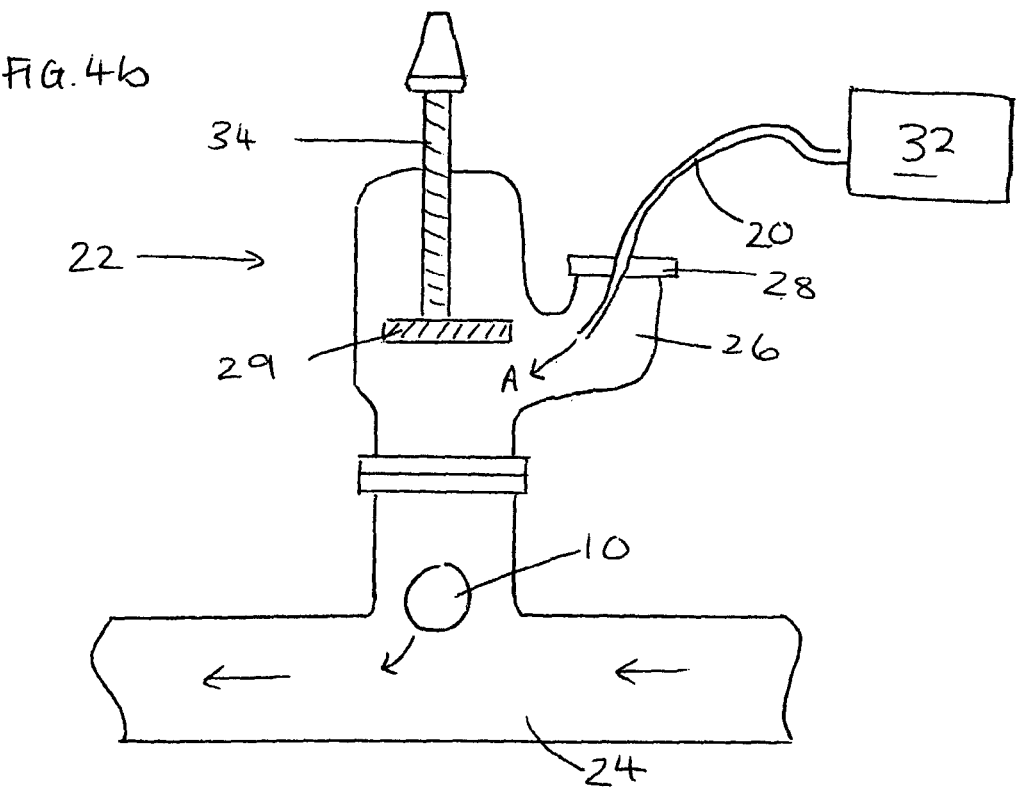

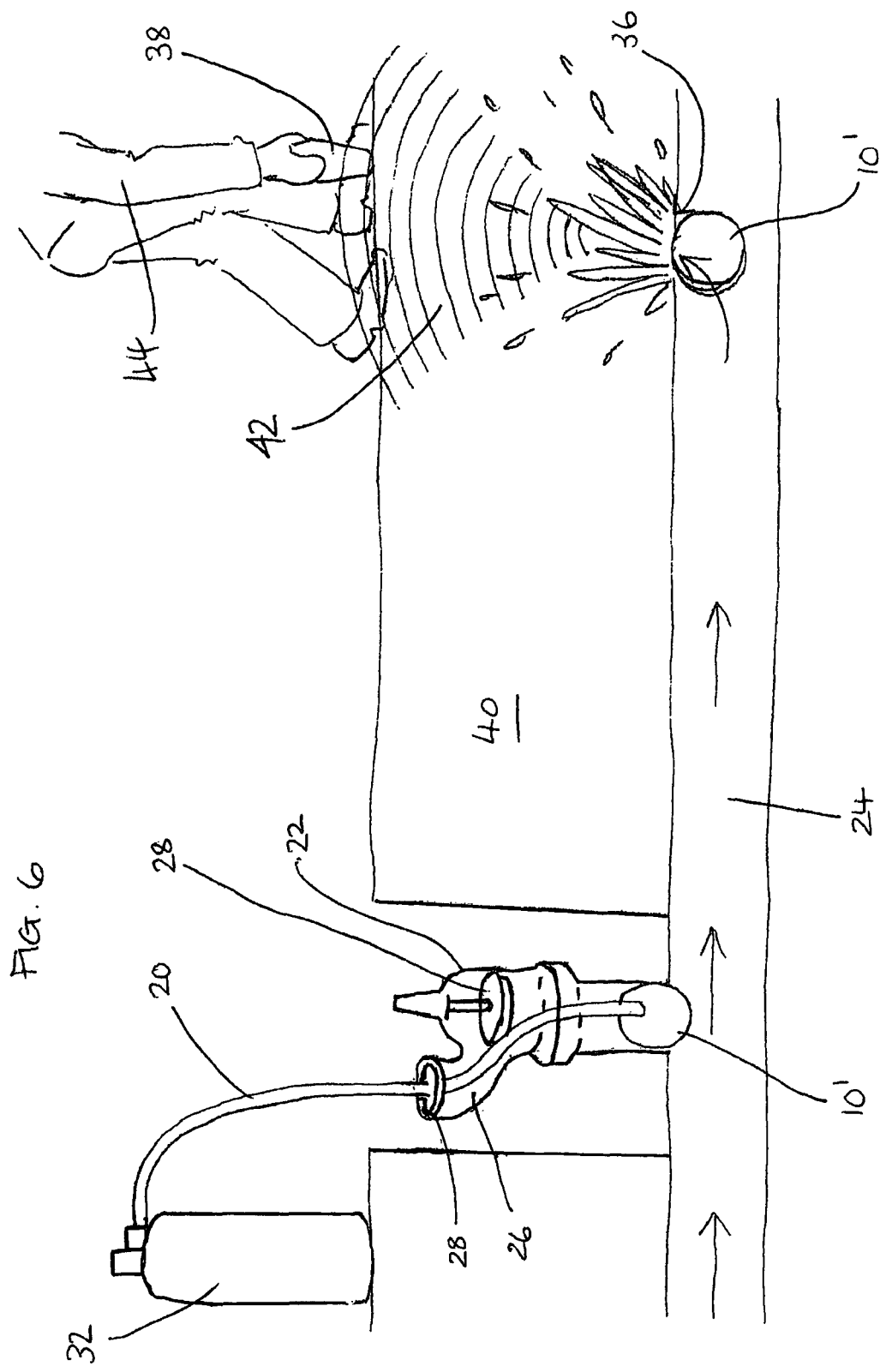

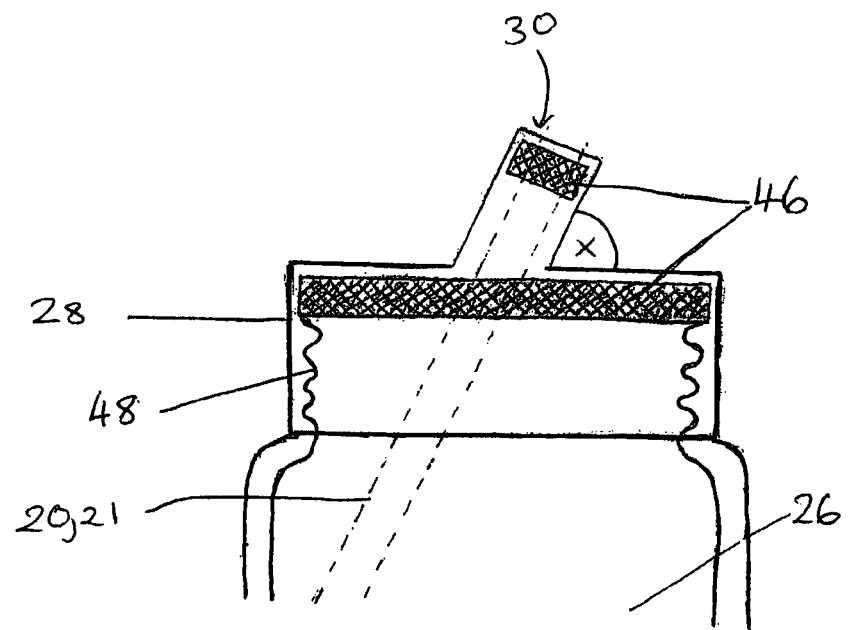

SYSTEM AND METHOD FOR LOCATING LEAKS IN PIPELINES

FIELD OF THE INVENTION

The present invention relates to a system and method for locating leaks in fluid-carrying ducts or pipelines, particularly water-carrying pipelines.

BACKGROUND OF THE INVENTION

Pipes carrying fluid, such as water, are usually located underground. Leaks in water pipes can lead to reduced pressure in the pipeline as well as potential contamination of the water being carried in the pipes.

It is known from EP2902690 to use an untethered, ball-shaped sensor unit adapted to roll along the interior surface of a water-carrying pipeline. The sensor unit uses acoustic sensors to detect leaks and records their location, so that they can be investigated and repaired from the surface. The sensor is not designed to stop at the location of the leak.

GB2435329 describes a device is for detecting leaks located between two stopcocks. Water flow into the pipe must be turned off before a spherical detection element is placed into the pipe and forced along the pipe using an auxiliary water supply and pump. The detection element is carried along the pipe by the pumped water until it reaches the leak, where it is retained. The detection element includes an RF transmitter which can be detected above ground using a receiver.

U.S. Pat. No. 4,016,748 also describes leak locator apparatus. To use the apparatus, water flow into the pipeline is turned off and outlets from the pipeline are also shut down. Fluid is then pumped through the line using a pump and a floating leak sensor is pushed into the pipeline from the leak locator apparatus. The floating leak sensor stops at the point of the leak. The floating leak sensor contains an electronic sound transmitter. A sound sensitive receiver is used above ground to detect the location of the leak sensor.

It would be desirable to provide an improved leak detection system which does not require the flow of liquid in the pipeline to be turned off before using the system to locate a leak.

SUMMARY OF THE INVENTION

Accordingly, a first aspect of the invention provides a system for locating a leak site in an underground water pipeline, the system comprising a leak detection element, means for introducing the leak detection element into the pipeline through an outlet of a hydrant, and means for detecting the location of the leak detection element from above the ground, wherein the means for introducing the leak detection element into the pipeline includes capping means adapted for attachment to, and sealing of, the outlet of the hydrant, the capping means having at least one opening therethrough to allow passage of an elongate element through the capping means and into the outlet of the hydrant, wherein the capping means is provided with a substantially waterproof membrane to provide a seal between the capping means and the outlet of the hydrant, and the at least one opening is provided with a substantially waterproof membrane to provide a seal between the elongate element and the at least one opening.

The elongate element may be a rod or a hose.

The system does not require the water flow in the pipeline to be stopped prior to the introduction of the leak detection element through the hydrant.

Hydrants, or hydrant valves are incorporated widely along water main pipelines and are often referred to as fire hydrants.

Preferably the waterproof membrane is a rubber membrane.

Preferably, the leak detection element includes an electromagnetic signal transmitter and the means for detecting the location of the leak detection element is an electromagnetic signal receiver. The electromagnetic signal may be a radio frequency signal.

The elongate rod or hose may further comprise an enlarged portion at one end for guiding the leak detection element into the pipeline. The enlarged portion may be shaped to at least partially surround the leak detection element.

Alternatively, the system may further comprise a source of pressurised fluid connected to a first end of a hose passing through the at least one opening of the capping means and the pressurised fluid has a pressure greater than the pressure of the water in the pipeline. The pressurised fluid is selected from the group comprising: pressurised air, pressurised water and chlorinated pressurised water. Preferably the pressurised fluid has a pressure of at least 5 bar.

The system may further comprise means for releasably attaching the leak detection element to a second end of the hose passing through the at least one opening of the capping means. The means for releasably attaching the leak detection element to a second end of the hose preferably comprises a socket located on the leak detection element and a nozzle on the second end of the hose, the nozzle shaped to fit into the socket.

The capping means may have an upper surface and the opening of the capping means may be set at an acute angle to the upper surface of the capping means.

Preferably the opening of the capping means is set at an angle of approximately 30 degrees to the upper surface of the capping means.

Preferably, the capping means is provided with an internal screw thread which mates with a screw thread provided on the outlet of the hydrant.

The electromagnetic signal receiver may further comprise a GPS tracking device to enable the path of the receiver to be tracked.

A second aspect of the invention provides a method for locating a leak site in an underground water pipeline using a system for locating a leak site in an underground water pipeline as hereinbefore defined, the method comprising the steps of:

(a) inserting a leak detection element into an outlet of a hydrant located upstream of the leak site, the hydrant including a valve which is closed to flow of water from the water pipeline;

(b) applying a capping means to the outlet to seal the outlet to water flow, the capping means having at least one opening therethrough to allow passage of an elongate element through the capping means and into the outlet of the hydrant, wherein the capping means is provided with a substantially waterproof membrane to provide a seal between the capping means and the outlet of the hydrant, and the at least one opening is provided with a substantially waterproof membrane to provide a seal between the elongate element and the at least one opening;

(c) opening the hydrant valve to allow access to the pipeline;

(d) urging the leak detection element into the pipeline;

(e) allowing the leak detection element to flow through the pipeline towards the leak site, where the element will be retained by the pressure differential at the leak site;

(f) moving the electromagnetic signal receiver above ground along a direction in which the pipe is buried; and (g) using the electromagnetic signal receiver to detect electromagnetic signals transmitted by the electromagnetic signal transmitter of the leak detection element, and thereby determining the location of the leak site;

wherein the leak detection element is inserted into the pipeline without stopping the flow of water in the pipeline.

In step (d) the leak detection element may be manually urged into the pipeline using the elongate element.

The elongate element may be a rod or a hose.

Alternatively, in step (d) a source of pressurised fluid may be connected to a first end of a hose passing through the at least one opening of the capping means and the source of pressurised fluid may be activated in order to urge the leak detection element into the pipeline.

Alternatively, the leak detection element is releasably attachable to a second end of the hose passing through the at least one opening of the capping means and the hose is used to manually urge the leak detection element towards the pipeline and the source of pressurised fluid activated in order to urge the leak detection element away from the hose and into the pipeline.

According to a third aspect of the invention there its provided a means for introducing the leak detection element into the pipeline includes capping means adapted for attachment to, and sealing of, the outlet of the hydrant, the capping means having at least one opening therethrough to allow passage of an elongate element through the capping means and into the outlet of the hydrant, wherein the capping means is provided with a substantially waterproof membrane to provide a seal between the capping means and the outlet of the hydrant, and the at least one opening is provided with a substantially waterproof membrane to provide a seal between the elongate element and the at least one opening.

According to a fourth aspect of the invention there is provided a leak detection element and a means for introducing the leak detection element into a pipeline according to the third aspect of the invention, the elongate element in the form of a hose, and means for releasably attaching the leak detection element to a second end of the hose passing through the at least one opening of the capping means.

The means for releasably attaching the leak detection element to a second end of the hose preferably comprises a socket located on the leak detection element and a nozzle on the second end of the hose, the nozzle shaped to fit into the socket.

The system and method of the invention provide an improved leak detection system which does not require the flow of water in the pipeline to be turned off before using the system to determine the location of a leak.

BRIEF DESCRIPTION OF THE DRAWINGS

In the drawings, which illustrate a preferred embodiment of the apparatus of the invention, and are by way of example:

FIG. 3a is a schematic cross-sectional view of a hydrant and connected water pipeline, illustrating a means of introduction the leak detection element of FIG. 2 into the pipeline, where the hydrant valve is closed and the leak detection element is located in the outlet of the hydrant;

FIG. 3b is a schematic cross-sectional view of a hydrant and connected water pipeline of FIG. 3a, where the hydrant valve is closed, the leak detection element is located in the outlet of the hydrant and a capping element is sealing the outlet;

FIG. 3c is a schematic cross-sectional view of a hydrant and connected water pipeline, of FIGS. 3a and 3b, where the hydrant valve is open and the leak detection element is located in the pipeline;

FIG. 4a is a schematic cross-sectional view of a hydrant and connected water pipeline illustrating a means of introduction the leak detection element of FIG. 1 into the pipeline, where the hydrant valve is closed and the leak detection element is located in the outlet of the hydrant;

FIG. 4b is a schematic cross-sectional view of a hydrant and connected water pipeline of FIG. 4a, where the hydrant valve is open and the leak detection element is located in the pipeline;

FIG. 6 is a schematic cross-sectional view of a sealing cap used to seal the hydrant outlet; and FIG. 7 is a schematic cross-sectional view of an example of a leak detection element of the invention being deployed through a hydrant and approaching a leak site in a pipe.

DETAILED DESCRIPTION OF THE PREFERRED EMBODIMENTS OF THE INVENTION

Figure 1:
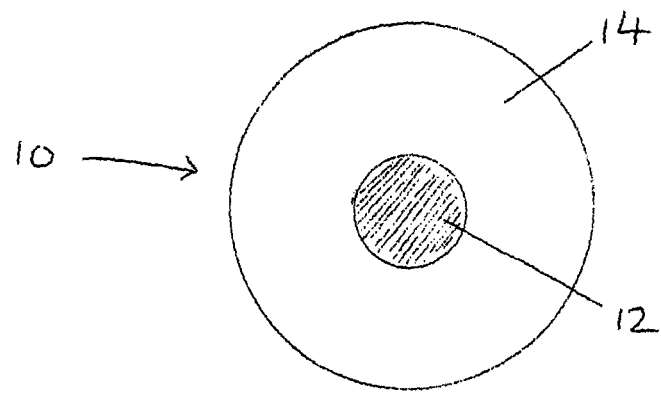
FIG. 1 illustrates a cross-sectional view of an example of a leak detection element of the invention.

FIG. 1 illustrates a cross section through a leak detection element 10 according to an embodiment of the invention. The leak detection element 10 is substantially spherical and includes a core 12 which includes an electromagnetic signal transmitter, in this example a radio frequency transmitter, and associated power supply. The core 12 may be watertight to prevent water from damaging the electromagnetic signal transmitter, and may comprise a waterproof pouch. Alternatively, the electromagnetic transmitter itself is provided with a waterproof coating, such as a rubber coating. The core is preferably surrounded by an outer layer of foam 14. The leak detection element 10 is preferably buoyant in water.

Figure 2:
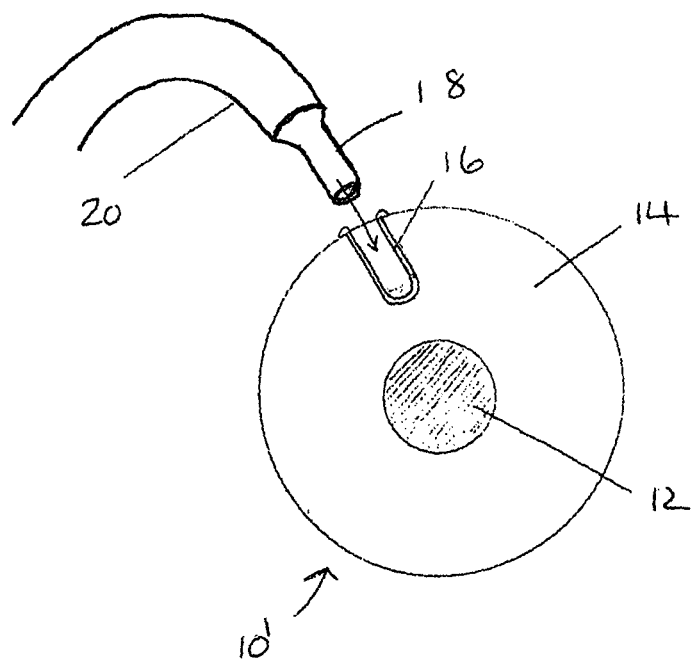
FIG. 2 illustrates a cross-sectional view of a further example of a leak detection element of the invention.

In the embodiment illustrated in FIG. 2, the leak detection element 10' further includes attachment means in the form of a socket 16 shaped to enable releasable attachment to the nozzle 18 of a hose 20.

The leak detection elements 10, 10' are used to locate leaks in underground pipelines or water mains. FIGS. 3a to 5b illustrate different means for introducing the leak detection element 10, 10' into a water main via a fire hydrant, without needing to shut off the water supply.

FIGS. 3a, 3b and 3c illustrate a hydrant 22 connected to a water main pipeline 24. Water is flowing through the pipeline 24 in the direction of the arrows. To locate the site of a leak in the pipeline 24 upstream of the hydrant 22, a leak detection element 10' is inserted into the pipeline 24 through the outlet 26 of the hydrant 22. At first, as shown in FIG. 3a, the hydrant valve 29 remains closed, preventing flow of water from the pipeline 24 into the outlet 26 of the hydrant 22. As shown in FIG. 3b, the outlet 26 of the hydrant 22 is then sealed using a hydrant sealing cap 28, the cap 28 having an aperture 30 therethrough to allow a hose 20 to freely pass through the sealing cap 28. One end of the hose 20 is connected to a source of pressurised fluid 32. The other end of the hose 20 is provided with a nozzle (not shown) which in turn is connected to a complementary socket 16 on the leak detection element 10'. Once the sealing cap 28 is in position, the hydrant valve 29 is opened using an appropriate tool. Turning the hydrant spindle 34 raises the hydrant valve 29, allowing water from the pipeline 24 to enter the outlet 26 of the hydrant 22. As shown in FIG. 3c, after the valve 29 has been opened the hose is pushed further into the hydrant, past the valve 29 urging the leak detection element 10' towards the pipeline 24. The leak detection element 10' preferably has an outer layer of foam 14 (see FIG. 2) which allows it to be squashed, aiding entry to the pipeline 24. Once the leak detection element 10' is in, or close to, the pipeline 24, pressurised fluid from the cylinder 32 is released into the hose 20, causing the leak detection element 10' to separate from the hose 20 and be released into the pipeline 24. At this stage the leak detection element 10' is carried along the pipeline by the water in the pipeline.

Mains water is generally at a pressure in the range 2-4 bar. The pressurised fluid must be released at a higher pressure in order to push the leak detection element into the pipeline. In this example the pressurised fluid is at a pressure of approximately 8 bar. The fluid may be water, chlorinated water, or air.

FIGS. 4a and 4b illustrate alternative means of introducing the leak detection element 10 into the pipeline 24 via a hydrant 22. In this example the leak detection element 10 is not connectable to the hose 20. Instead, the leak detection element 10 is pushed into the outlet 26 of the hydrant 22 as shown in FIG. 4a and then the hydrant sealing cap 26 is secured onto the hydrant, with the hose 20 passing through an opening 30 therethrough. Once the sealing cap 28 is in position, the hydrant valve 29 is opened using an appropriate tool. Turning the hydrant spindle 34 raises the hydrant valve 29, allowing water from the pipeline 24 to enter the outlet 26 of the hydrant 22. After the hydrant valve 29 has been opened, pressurised fluid from the cylinder 32 is released into the hose 20, as shown by arrow A in FIG. 4b, and this surge of pressurised fluid urges the leak detection element in a downwards direction towards the pipeline. The leak detection element 10 is then carried along the pipeline by the water flowing in the pipeline. Again, mains water is generally at a pressure in the range 2-4 bar. The pressurised fluid must be released at a higher pressure in order to push the leak detection element into the pipeline. In this example the pressurised fluid is at a pressure of approximately 8 bar. The fluid may be water, chlorinated water, or air.

Figure 5A:
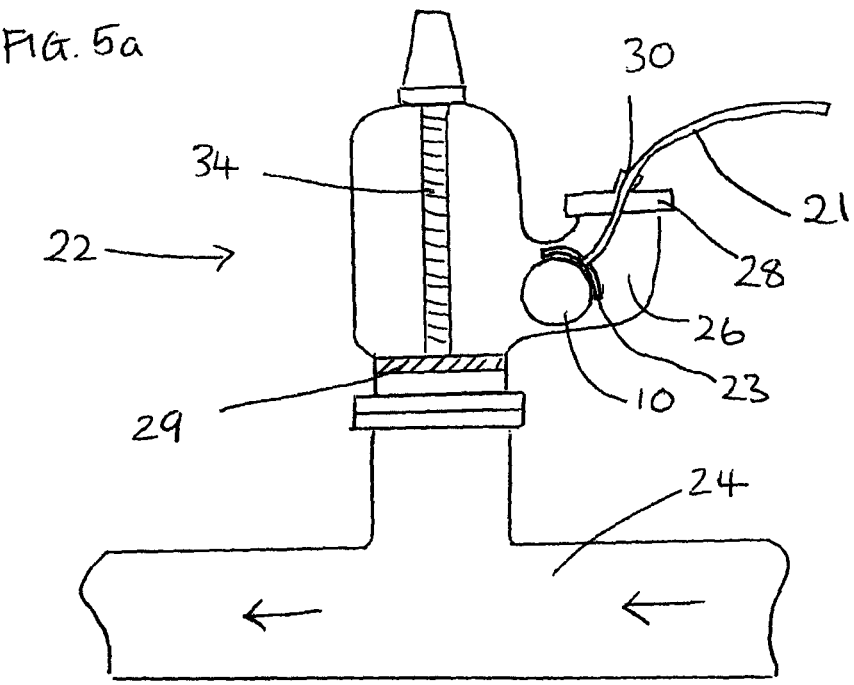
FIG. 5a is a schematic cross-sectional view of a hydrant and connected water pipeline illustrating a further means of introduction the leak detection element of FIG. 1 into the pipeline, where the hydrant valve is closed and the leak detection element is located in the outlet of the hydrant.
Figure 5B:
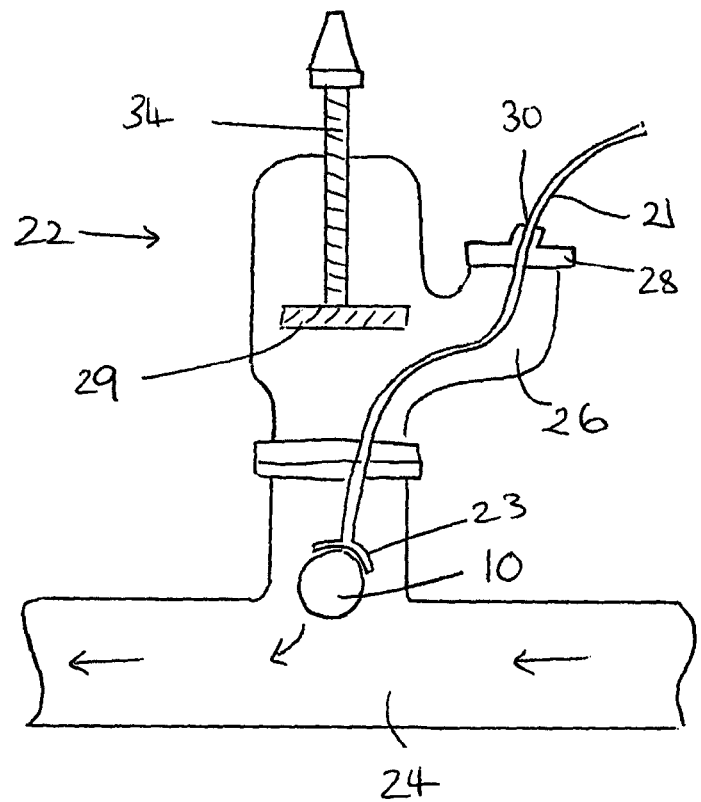
FIG. 5b is a schematic cross-sectional view of a hydrant and connected water pipeline of FIG. 5a, where the hydrant valve is open and the leak detection element is located in the pipeline.

FIGS. 5a and 5b illustrate further alternative means of introducing the leak detection element 10 into the pipeline 24 via a hydrant 22. In this example a flexible rod 21, preferably with an enlarged end portion 23 is inserted through the opening 30 in the sealing cap 28. The enlarged end portion 23 is preferably shaped to fit at least partially around the leak detection element. As illustrated in FIG. 5b, the rod 21 is used to manually urge the leak detection element 10 towards the pipeline 24 where it is then carried along the pipeline by the water flowing in the direction of the arrows.

FIG. 6 illustrates a water pipeline 24 installation connected to a hydrant 22 and the leak detection element 10' locating the site of a leak 36 located upstream of the hydrant 22.

In order to detect the location of the leak, the leak detection element 10' is inserted into the pipeline 24 as described in relation to FIGS. 3a to 3c. The diameter of the leak detection element 10' is sufficiently small for it to move easily along the interior of the pipeline 24, but sufficiently large to prevent it escaping through the wall of the pipeline at the site of the leak 36. In a preferred example the leak detection element 10, 10' is approximately 70 mm in diameter.

Water flows through the pipeline 24 in the direction of the arrows, towards the leak site 36, carrying the leak detection element 10' until the leak detection element 10' reaches the leak 36, where it is retained by the water pressure in the pipeline as shown in FIG. 4.

The leak detection element 10' continually transmits a signal 42 through the ground 40. The transmitted signal 42 is monitored at ground level by a signal receiver 38 carried by a user 44 walking above ground in the vicinity of the buried pipeline 24. The signal receiver 38 preferably provides the user 44 with an audible and/or visual indicator relating to the intensity of the received signal. A maximum level of signal received by the signal receiver 38 will indicate that the user 44 is directly above the site of the leak 36. After the location of the leak 36 has been determined, further action can be taken to repair the leak.

FIG. 7 illustrates a cross-sectional view through the sealing cap 28 attached to the outlet of a fire hydrant. The sealing cap 28 is provided with an internal thread 48 which allows it to be connected to the hydrant outlet 26. The sealing cap 28 has an opening 30 to allow passage of a hose 20 or rod 21 therethrough. The opening 30 is preferably set an angle to the top of the cap 28 as this helps guide the hose 20 or rod 21 towards the pipeline when the hydrant valve 29 is open. The angle X is preferably around 30 degrees. The inside of the cap 28 is also provided with waterproof seals 46, for example rubber membranes, around both the internal upper edge of the cap and around the outlet 30, this prevents water from the pipeline from escaping through the sealing cap 28 when the hydrant valve 29 is opened. The signal receiver 38 may also be provided with a GPS tracking device which records the movements of the signal receiver as the user follows the transmitted signal from the leak detection element 10, 10'. This allows the approximate path of the pipeline to the leak to be mapped from above-ground.

The invention claimed is:

1. A system for locating a leak site in an underground water pipeline, the system comprising a leak detection element, means for introducing the leak detection element into the pipeline through an outlet of a hydrant valve, and means for detecting the location of the leak detection element from above the ground, wherein the means for introducing the leak detection element into the pipeline includes capping means adapted for attachment to, and sealing of the outlet of the hydrant, the capping means having at least one opening therethrough to allow passage of an elongate element through the capping means and into the outlet of the hydrant, wherein the capping means is provided with a substantially waterproof membrane to provide a seal between the capping means and the outlet of the hydrant, and the at least one opening is provided with a substantially waterproof membrane to provide a seal between the elongate element and the at least one opening.

2. A system according to claim 1, wherein the leak detection element includes an electromagnetic signal transmitter and the means for detecting the location of the leak detection element is an electromagnetic signal receiver.

3. A system according to any of claims 2, wherein the electromagnetic signal receiver further comprises a GPS tracking device.

4. A system according to claim 1, wherein the elongate element further comprises an enlarged portion at one end for guiding the leak detection element into the pipeline.

5. A system according to claim 1, wherein the elongate element is a hose, the system further comprising a source of pressurised fluid connected to a first end of the hose passing through the at least one opening of the capping means, wherein the pressurised fluid has a pressure greater than the pressure of the water in the pipeline.

6. A system according to claim 5, wherein the pressurised fluid is selected from the group comprising: pressurised air, pressurised water and chlorinated pressurised water.

7. A system according to claim 5, wherein the pressurised fluid has a pressure of at least 5 bar.

8. A system according to claim 5, further comprising means for releasably attaching the leak detection element to a second end of the hose passing through the at least one opening of the capping means.

9. A system according to claim 8, wherein the means for releasably attaching the leak detection element to a second end of the hose comprises a socket located on the leak detection element and a nozzle on the second end of the hose, the nozzle shaped to fit into the socket.

10. A system according to claim 1, wherein the capping means has an upper surface and the opening of the capping means is set at an acute angle to the upper surface of the capping means.

11. A system according to claim 10, Wherein the opening of the capping means is set at an angle of approximately 30 degrees to the upper surface of the capping means.

12. A system according to claim 1, wherein the capping means is provided with an internal screw thread.

13. A system according to claim 1, wherein the electromagnetic signal is a radio frequency signal.

14. A method for located a leak site in an underground water pipeline using a system according to claim 1, the method comprising the steps of:
(a) inserting a leak detection element into an outlet of a hydrant located upstream of the leak site, the hydrant including a valve which is closed to flow of water from the water pipeline;
(b) applying a capping means to the outlet to seal the outlet to water flow, the capping means having at least one opening therethrough to allow passage of an elongate element through the capping means and into the outlet of the hydrant, wherein the capping means is provided with a substantially waterproof membrane to provide a seal between the capping means and the outlet of the hydrant, and the at least one opening is provided with a substantially waterproof membrane to provide a seal between the elongate element and the at least one opening;
(c) opening the hydrant valve to allow access to the pipeline;
(d) urging the leak detection element into the pipeline;
(e) allowing the leak detection dement to flow through the pipeline towards the leak site, where the element will be retained by the pressure differential at the leak site;
(f) moving the electromagnetic signal receiver above ground along a direction in which the pipe is buried; and (g) using the electromagnetic signal receiver to detect electromagnetic signals transmitted by the electromagnetic signal transmitter of the leak detection element, and thereby determining the location of the leak site;
wherein the leak detection element is inserted into the pipeline without stopping the flow of water in the pipeline.

15. A method according to claim 14 wherein in step (d) the leak detection element is manually urged into the pipeline using the elongate element.

16. A method according to claim 14 wherein in step (d) the elongate element is a hose and a source of pressurised fluid is connected to a first end of the hose passing through the at least one opening of the capping means and wherein the source of pressurised fluid is activated in order to urge the leak detection element into the pipeline.

17. A method according to claim 16, wherein the leak detection element is releasably attachable to a second end of the hose passing through the at least one opening of the capping means and wherein the hose is used to manually urge the leak detection element towards the pipeline and the source of pressurised fluid activated in order to urge the leak detection element away from the hose and into the pipeline.

* * * * *